United States Patent
Valeri et al.

(10) Patent No.: US 9,824,511 B2
(45) Date of Patent: Nov. 21, 2017

(54) VEHICLE DIAGNOSIS BASED ON VEHICLE SOUNDS AND VIBRATIONS

(71) Applicant: GM GLOBAL TECHNOLOGY OPERATIONS LLC, Detroit, MI (US)

(72) Inventors: Frank C. Valeri, Novi, MI (US); Scott M. Reilly, Southfield, MI (US); Roger C. Barlow, Jr., Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 14/851,585

(22) Filed: Sep. 11, 2015

(65) Prior Publication Data

US 2017/0076514 A1   Mar. 16, 2017

(51) Int. Cl.
| | |
|---|---|
| *G01M 17/00* | (2006.01) |
| *G06F 7/00* | (2006.01) |
| *G06F 19/00* | (2011.01) |
| *G07C 5/08* | (2006.01) |
| *G05B 23/00* | (2006.01) |

(52) U.S. Cl.
CPC .......... *G07C 5/0808* (2013.01); *G05B 23/00* (2013.01)

(58) Field of Classification Search
None
See application file for complete search history.

(56) References Cited

U.S. PATENT DOCUMENTS

| | | | | | |
|---|---|---|---|---|---|
| 5,412,584 | A | * | 5/1995 | Umeno | G01L 17/00 702/140 |
| 5,445,026 | A | * | 8/1995 | Eagan | G01H 3/12 73/40.5 A |
| 5,712,805 | A | * | 1/1998 | Wang | G01S 3/80 367/1 |
| 6,131,454 | A | * | 10/2000 | Kopp | G01M 13/025 73/457 |
| 6,175,787 | B1 | * | 1/2001 | Breed | B60N 2/0232 340/438 |
| 6,360,607 | B1 | * | 3/2002 | Charette | G01N 29/11 73/584 |
| 6,728,658 | B1 | * | 4/2004 | Bechhoefer | G01H 1/003 702/181 |
| 6,766,230 | B1 | * | 7/2004 | Rizzoni | B60G 17/0185 701/32.9 |
| 6,775,642 | B2 | * | 8/2004 | Remboski | G01N 29/14 702/183 |
| 7,027,953 | B2 | * | 4/2006 | Klein | G01H 1/006 702/182 |
| 7,082,359 | B2 | * | 7/2006 | Breed | G07C 5/008 701/31.5 |
| 7,103,460 | B1 | * | 9/2006 | Breed | B60C 23/0408 701/29.1 |

(Continued)

*Primary Examiner* — Bhavesh V Amin
(74) *Attorney, Agent, or Firm* — Lorenz & Kopf, LLP

(57) ABSTRACT

Methods and systems for diagnosing vehicle systems using vehicle sounds, vibrations, or both, are provided. In one embodiment, a system comprises one or more sensors and a processor. The one or more sensors are configured to measure a sound, a vibration, or both, produced by one or more vehicle components. The processor is coupled to the one or more sensors. The processor is configured to compare the measured sound, vibration, or both with an expected sound for the one or more vehicle components, generating a comparison; and diagnose a vehicle system or device using the comparison.

20 Claims, 2 Drawing Sheets

(56) References Cited

U.S. PATENT DOCUMENTS

| | | | | |
|---|---|---|---|---|
| 7,174,264 B2* | 2/2007 | Yasukawa | | B41J 29/38 702/115 |
| 7,184,930 B2* | 2/2007 | Miyasaka | | B61F 15/20 246/169 A |
| 7,860,663 B2* | 12/2010 | Miyasaka | | G01H 1/003 702/113 |
| 7,933,742 B2* | 4/2011 | Ishii | | G01H 3/125 340/438 |
| 8,296,103 B2* | 10/2012 | Son | | G01H 1/00 702/183 |
| 2002/0194915 A1* | 12/2002 | Abdel-Malek | | G01N 29/14 73/587 |
| 2003/0065482 A1* | 4/2003 | Bechhoefer | | G01H 1/003 702/183 |
| 2005/0066730 A1* | 3/2005 | Raichle | | G01N 29/14 73/579 |
| 2005/0096873 A1* | 5/2005 | Klein | | G01H 1/006 702/184 |
| 2005/0216145 A1* | 9/2005 | Bellinger | | F02D 41/1498 701/33.9 |
| 2006/0142972 A1* | 6/2006 | Cancilla | | G05B 23/0229 702/183 |
| 2006/0154783 A1* | 7/2006 | Petzold | | B60W 50/029 477/107 |
| 2008/0133177 A1* | 6/2008 | Klenk | | F02D 41/22 702/183 |
| 2008/0134789 A1* | 6/2008 | Schneider | | F02D 41/22 73/587 |
| 2008/0234964 A1* | 9/2008 | Miyasaka | | G01H 1/003 702/113 |
| 2008/0257047 A1* | 10/2008 | Pelecanos | | G01H 1/00 73/587 |
| 2009/0064762 A1* | 3/2009 | Horner | | F02D 35/027 73/35.05 |
| 2009/0301060 A1* | 12/2009 | Kennie | | F01N 9/00 60/285 |
| 2010/0212295 A1* | 8/2010 | Narayanaswamy | | F02D 41/0235 60/285 |
| 2010/0222961 A1* | 9/2010 | Dlugoss | | G01L 25/003 701/29.2 |
| 2010/0274443 A1* | 10/2010 | Dlugoss | | F16H 59/16 701/29.2 |
| 2011/0106510 A1* | 5/2011 | Poon | | G05B 23/0283 703/2 |
| 2011/0270509 A1* | 11/2011 | Whitney | | F02D 13/0219 701/103 |
| 2012/0031202 A1* | 2/2012 | Goto | | B62D 5/049 73/862.193 |
| 2012/0191319 A1* | 7/2012 | Kutoba | | F02B 33/36 701/99 |
| 2013/0073260 A1* | 3/2013 | Maeda | | G05B 23/0224 702/183 |
| 2013/0125684 A1* | 5/2013 | Bradley | | F16H 61/12 74/325 |
| 2014/0046614 A1* | 2/2014 | Pettersson | | G01M 13/04 702/113 |
| 2014/0279707 A1* | 9/2014 | Joshua | | G06Q 30/0283 705/400 |
| 2014/0347043 A1* | 11/2014 | Chana | | G01M 13/021 324/242 |
| 2016/0300559 A1* | 10/2016 | Lee | | G10K 11/1788 |

* cited by examiner

US 9,824,511 B2

VEHICLE DIAGNOSIS BASED ON VEHICLE SOUNDS AND VIBRATIONS

TECHNICAL FIELD

The present disclosure generally relates to vehicles, and more particularly relates to methods and systems for diagnosing one or more vehicle systems using vehicle sounds and vibrations.

BACKGROUND

Vehicles today have various different systems that may require diagnosis. While many techniques are currently available for diagnosing vehicle systems, it may be desirable to provide further methods and systems for diagnosing vehicle systems.

Accordingly, it is desirable to provide techniques for diagnosing vehicle systems. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises measuring a sound, a vibration, or both produced by one or more vehicle components; comparing the measured sound, vibration, or both, with an expected sound for the one or more vehicle components, generating a comparison; and diagnosing a vehicle system or device using the comparison.

In accordance with another exemplary embodiment, a method is provided. The method comprises operating one or more test vehicles under a plurality of conditions, each of the plurality of conditions representing a different combination of values of different vehicle parameters; measuring a corresponding powertrain-related sound, vibration, or both, for each of the plurality of conditions; and storing, in memory, information pertaining to each of the plurality of conditions along with the corresponding powertrain-related sound, vibration, or both for each of the plurality of conditions, for subsequent use in diagnosing one or more vehicle systems or devices by comparing engine-related sounds, vibrations, or both in a subsequent drive cycle with the stored information.

In accordance with a further exemplary embodiment, a system is provided. The system comprises one or more sensors and a processor. The one or more sensors are configured to measure a sound, a vibration, or both produced by one or more vehicle components. The processor is coupled to the one or more sensors. The processor is configured to compare the measured sound, vibration, or both with an expected sound for the one or more vehicle components, generating a comparison; and diagnose a vehicle system or device using the comparison.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
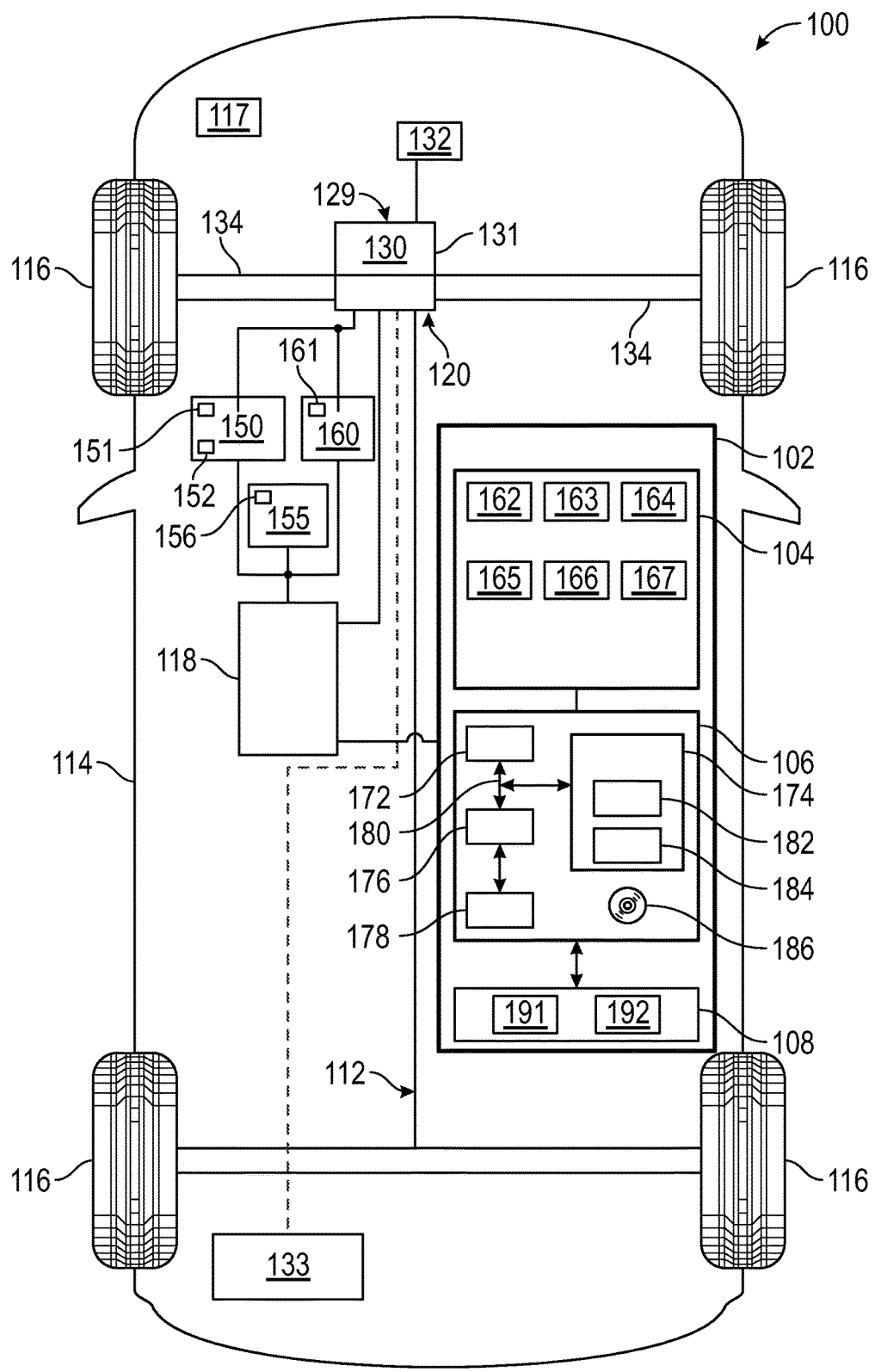
FIG. 1 is a functional block diagram of a vehicle that includes a control system for diagnosing vehicle systems using vehicle sounds, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As described in greater detail further below, the vehicle 100 includes a control system 102 for diagnosing vehicle systems using vehicle sounds and vibrations. As discussed further below, the control system 102 includes a sensor array 104, a controller 106, and a notification unit 108. In various embodiments, the control system 102 diagnoses various vehicle systems using vehicle sounds and vibrations, in accordance with the steps set forth further below in connection with the process 200 of FIG. 2.

In one embodiment depicted in FIG. 1, vehicle 100 includes, in addition to the above-referenced control system 102, a chassis 112, a body 114, four wheels 116, an electronic system 118, a powertrain 129, a steering system 150, a braking system 155, and one or more other driver input systems 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114, and are part of a vehicle suspension system 117. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine, and is housed in an engine mounting apparatus 131. In various other embodiments, the engine 130 may comprise an electric motor and/or one or more other transmission system 129 components (e.g. for an electric vehicle), and the mounting apparatus 131 may refer to a mounting apparatus for such electric motor and/or other transmission system 129 components. It will also be appreciated that in various embodiments the vehicle 100 may include other mounting apparatus for other components of the powertrain 129 (e.g. an electric motor) and/or for other vehicle components (e.g. vehicle suspension system 117).

Also in the depicted embodiment, the engine 130 is coupled to an induction system 132 for the vehicle 100 that controls the intake of air for the vehicle and fuel for the engine 100. In addition, also in the depicted embodiment, the engine 130 is further coupled to an exhaust system 133 for the exit of air and exhaust out of the vehicle 100.

It will be appreciated that in other embodiments, the actuator assembly 120 may include one or more other types of engines and/or motors, such as an electric motor/generator, instead of or in addition to the combustion engine. In certain embodiments, the electronic system 118 comprises an engine system that controls the engine 130 and/or one or more other systems of the vehicle 100.

Still referring to FIG. 1, in one embodiment, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In the depicted embodiment, the steering system 150 includes a steering wheel 151 and a steering column 152. In various embodiments, the steering wheel 151 receives inputs from a driver of the vehicle 100, and the steering column 152 results in desired steering angles for the wheels 116 via the drive shafts 134 based on the inputs from the driver. In certain embodiments, an autonomous vehicle may utilize steering commands that are generated by a computer, with no involvement from the driver.

The braking system 155 is mounted on the chassis 112, and provides braking for the vehicle 100. The braking system 155 receives inputs from the driver via a brake pedal 156, and provides appropriate braking via brake units (not depicted).

Other driver input systems 160 may include an acceleration input system comprising an accelerator pedal 161 that is engaged by a driver, with the engagement representative of a desired speed or acceleration of the vehicle 100. The other driver input systems 160 may also include, among other possible systems, various other inputs for various vehicle devices and/or systems, such as one or more vehicle radios, other entertainment systems, environmental systems, lighting units, navigation systems, and the like (not depicted). Similar to the discussion above regarding possible variations for the vehicle 100, in certain embodiments steering, braking, suspension, acceleration, and/or other driving features can be commanded by a computer instead of by a driver.

In one embodiment, the control system 102 is mounted on the chassis 112. As discussed above, the control system 102 diagnoses one or more vehicle systems and/or devices (collectively referred to herein as vehicle systems) based on one or more sounds and/or vibrations of the vehicle 100. In one embodiment, the control system 102 diagnoses the vehicle systems based on one or more measured powertrain and/or engine-related sounds and/or vibrations (e.g. as produced by the engine mounting apparatus 131, a mounting apparatus for another powertrain component such as an electric motor, in one embodiment, the induction system 132, and/or the exhaust system 133) as compared with expected engine-related sounds for operation of the vehicle 100 under various vehicle parameters (e.g. engine-produced torque, engine rpm, and a measure of engagement of the accelerator pedal).

As noted above and depicted in FIG. 1, in one embodiment the control system 102 comprises a sensor array 104, a controller 106, and a notification unit 108. The sensor array 104 includes various sensors (also referred to herein as sensor units and/or detection units) that are used for measuring sounds and vibrations of the vehicle 100. In various embodiments, the sensors of the sensor array 104 comprise one or more microphones, transducers, accelerometers, and/or other devices. In the depicted embodiment, the sensor array 104 includes one or more induction system sensors 162, engine mount sensors 163, exhaust sensors 164, torque sensors 165, accelerator pedal sensors 166, and other parameter sensors 167. In various embodiments, the sensor array 104 provides the measured information to the controller 106 for processing, and for vehicle diagnosis, in accordance with the steps of the process 200 of FIG. 2.

The induction system sensors 162 measure sound and/or vibration for the induction system 132 of the vehicle 100 (e.g. sound and/or vibration generated by the induction system 132 in relation to the operation of the engine 130). In one embodiment, the induction system sensors 162 include one or more microphones within the induction system 132. In another embodiment, the induction system sensors 162 include one or more microphones adjacent to, or otherwise in proximity to, the induction system 132. In various other embodiments, the induction system sensors 162 include one or more accelerometers disposed within, adjacent to, or otherwise proximate the induction system 132 that are configured to measure vibrations of or pertaining to the induction system 132. The types and/or positioning of the induction system sensors 162 may vary in other embodiments. In one embodiment, the induction system sensors 162 transmit a signal or data to the controller 106 for processing and for use in vehicle diagnosis. In one embodiment, the sounds are temporarily recorded to random access memory (RAM) of the memory and then compared. Also in one embodiment, once the sounds are compared, the sounds are replaced the subsequent sound values shortly thereafter (e.g. a few seconds later). In other words, in one embodiment, the enhancement system is taking data periodically (can be certain RPMs, times of day, time of driving, certain # of ignition cycles, etc) by monitoring recording transmitted sensor voltage. This monitored data can be compared to the predetermined levels of the reference signals.

The engine mount sensors 163 measure sound for the engine 130 of the vehicle 100, and/or for one or more other components of the transmission system 129 of the vehicle 100 (e.g. an electric motor for an electric vehicle, and so on). In one embodiment, the engine mount sensors 163 comprise one or more accelerometers that measure vibration of the engine mounting apparatus 131 from the operation of the engine 130. In one embodiment, the engine mount sensors 163 are disposed within the engine mounting apparatus 131 and/or other transmission system 129 component. In another embodiment, the engine mount sensors 163 are disposed adjacent to, or otherwise in proximity to, the engine mounting apparatus 131 and/or other transmission system component 129. In various other embodiments, the engine mount sensors 163 include one or more microphones disposed within, adjacent to, or otherwise proximate the engine mounting apparatus 132 (and/or mounting apparatus for one or more other transmission system 129 components) that are configured to measure sounds pertaining to the engine mounting apparatus 132 (and/or mounting apparatus for one or more other transmission system 129 components), and/or pertaining to one or more other mounting apparatus of the vehicle 100 (for example, a mounting apparatus for another powertrain 129 component, a mounting apparatus for a suspension system 117 of the vehicle 100, and so on). In certain embodiments, microphones and accelerometers may both be used. The types and/or positioning of the engine mount sensors 163 may vary in other embodiments.

In one embodiment, the engine mount sensors 163 transmit the sound and/or vibration to the controller 106 for processing and for vehicle diagnosis. In one embodiment, the sounds are temporarily recorded to random access memory (RAM) of the memory and then compared. Also in one embodiment, once the sounds are compared, the sounds are replaced the subsequent sound values shortly thereafter (e.g. a few seconds later). In other words, in one embodiment, the enhancement system is taking data periodically (can be certain RPMs, times of day, time of driving, certain number of ignition cycles, and so on) by monitoring recording transmitted sensor voltage. This monitored data can be compared to the predetermined levels of the reference signals.

The exhaust sensors 164 measure sound and/or vibration for the exhaust system 133 of the vehicle 100 (e.g. sound generated by the exhaust system 133 in relation to the operation of the engine 130). In one embodiment, the exhaust sensors 164 comprise one or more microphones that measure sound of the exhaust system 133. In another embodiment, the exhaust sensors 164 comprise one or more accelerometers that measure vibrations of the exhaust system 133. In certain embodiments, microphones and accelerometers may both be used. In one embodiment, the exhaust sensors 164 are disposed within the exhaust system 133. In another embodiment, the exhaust sensors 164 are disposed adjacent to, or otherwise in proximity to, the exhaust sensors 164. The types and/or positioning of the exhaust sensors 164 may vary in other embodiments. In one embodiment, the exhaust sensors 164 transmit the sound to the controller 106 for processing and for vehicle diagnosis.

The torque sensors 165 measure a torque generated by the engine 130. In certain embodiments, the torque sensors 165 measure wheel torque on one or more of the wheels 116 of the vehicle 100. In certain embodiments, such torque sensors 165 are disposed within, adjacent to, or otherwise in proximity to the powertrain of the vehicle 100 (e.g. the actuator assembly 120). In other embodiments, the torque sensors 165 are disposed within, adjacent to, or otherwise in proximity to one or more wheels 116 and/or axles 134 of the vehicle 100. The types and/or positioning of the torque sensors 165 may vary in other embodiments. In one embodiment, the information obtained via the torque sensors 165 is provided to the controller 106 for processing and for use in vehicle diagnosis.

The accelerator pedal sensors 166 measure a driver's engagement of the accelerator pedal 161. In certain embodiments, the accelerator pedal sensors 166 measure a force applied by the driver against the accelerator pedal 161. In other embodiments, the accelerator pedal sensors 166 measure a distance traveled by the accelerator pedal 161 when engaged by the driver. The types and/or positioning of the accelerator pedal sensors 166 may vary in other embodiments. In one embodiment, the information obtained via the accelerator pedal sensors 166 is provided to the controller 106 for processing and for use in vehicle diagnosis.

The other parameter sensors 167 measure one or more other vehicle parameters (e.g. in addition to torque and accelerator pedal engagement) that might also have an effect on expected sounds produced for the vehicle (e.g. engine-related sounds such as the induction system 132 sounds, the exhaust system 133 sounds, and the engine mounting apparatus 131 sounds/vibrations). In one such embodiment, the other parameter sensors 167 measure a speed and/or acceleration of the vehicle (e.g. via wheel speed sensors and/or accelerometer). Also in one embodiment, the other parameter sensors 167 measure or determine a number of revolutions per minute (rpm) of the engine 130. Also in certain embodiments, the other parameter sensors 167 include suspension sensors configured to measure sounds and/or vibrations of the suspension system 117 (e.g. vibrations pertaining to a mounting apparatus for the suspension system 117). It will be understood that the number and/or type of other parameter sensors 167 may vary in other embodiments. In one embodiment, the information obtained via the other parameter sensors 167 is provided to the controller 106 for processing and for use in vehicle diagnosis.

The controller 106 is coupled to the sensor array 104 and to the notification unit 108. The controller 106 utilizes the various measurements and information from the sensor array 104, and compares the monitored engine-related sounds with expected engine-related sounds (e.g. for the induction system 132, exhaust system 133, engine mounting apparatus 131, and/or suspension system 117) in view of the various related vehicle parameters (e.g. torque, engine rpm, accelerator pedal engagement, and the like) for diagnosing vehicle systems (and, in certain cases, providing notifications via the notification unit 108). In various embodiments, the controller 106, along with the sensor array 104 and the notification unit 108, provide these and other functions in accordance with the steps discussed further below in connection with the process 200 of FIG. 2.

As depicted in FIG. 1, the controller 106 comprises a computer system. In certain embodiments, the controller 106 may also include one or more of the sensors of the sensor array 104, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other systems, such as the electronic system 118, an infotainment unit of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. Specifically, in one embodiment, the processor 172 provides for vehicle system diagnosis based on a comparison of measured powertrain-related sounds and/or vibrations, engine-related sounds and/or vibrations, and/or other sounds and/or vibrations of the vehicle (for example, as obtained via the induction system sensors 162, the engine mount sensors 163, the exhaust sensors 164, and/or other sensors 167, such as suspension sensors) in comparison with expected sounds and/or vibrations for operation of the vehicle 100 under current vehicle parameters (e.g. engine-based torque, engine rpm, and a measure of engagement of the accelerator pedal 161). During operation, the processor 172 executes one or more programs 182 contained within the memory 174 and, as such, controls the general operation of the controller 106 and the computer system of the controller 106, generally in executing the processes described herein, such as the process 200 described further below in connection with FIG. 2.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIG. 2. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

The notification unit 108 is coupled to the controller 106, and provides certain notifications based on the vehicle sound/vibration-based diagnosis. Specifically, in certain embodiments, the notification unit 108 provides notifications pertaining to the diagnosis, for example for viewing or listening by occupants of the vehicle 100. As depicted in FIG. 1, the notification unit 108 includes an audio component 191 and a visual component 192. It will be appreciated that this may vary in other embodiments, and for example in some embodiments the notification may further comprise one or more other components (e.g. for delivering haptic notifications, and/for delivering electronic notifications to a user's telephone, computer, tablet, and so on). In various embodiments, the notification unit 108 provides notices based on instructions provided by the processor 172. Also in various embodiments, the notification unit 108 performs these and other functions in accordance with the steps of the process 200 described further below in connection with FIG. 2.

While the components of the control system 102 (including the sensor array 104, the controller 106, and the notification unit 108) are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, the electronic system 118, and/or one or more other systems of the vehicle 100.

Figure 2:
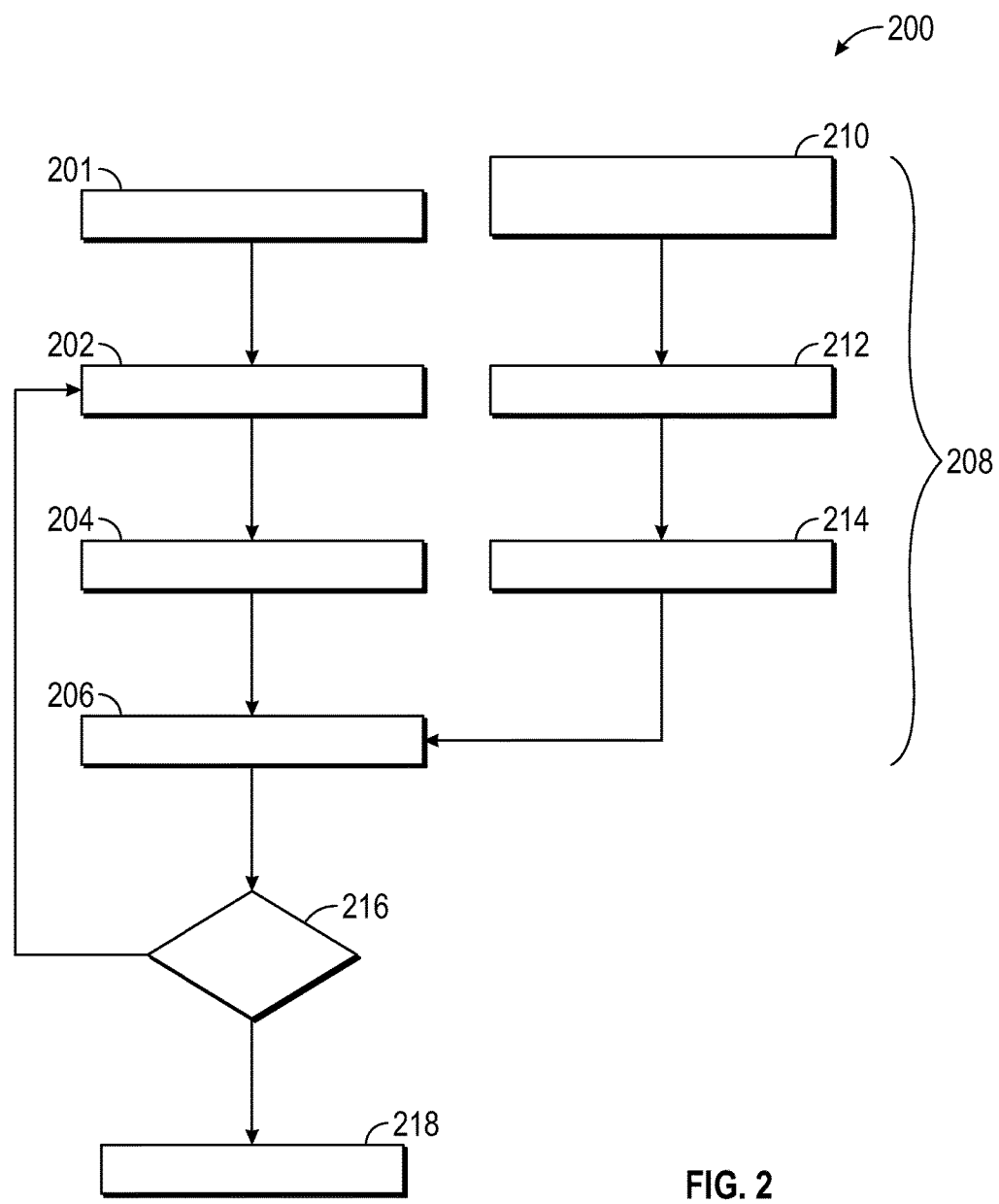
FIG. 2 is a flowchart of a process for diagnosing vehicle systems using vehicle sounds, and that can be used in connection with the vehicle of FIG. 1, in accordance with an exemplary embodiment.

FIG. 2 is a flowchart of a process 200 for conducting vehicle diagnosis based on vehicle sounds. The process 200 can be implemented in connection with the vehicle 100 of FIG. 1, in accordance with an exemplary embodiment.

As depicted in FIG. 2, the process 200 is initiated at step 201 when a user is operating the vehicle in a current vehicle cycle (e.g. when the engine of the vehicle is turned on in a current ignition cycle of the vehicle, after the vehicle has been purchased by an end user or driver). In one embodiment, the process 200 is performed continuously throughout the vehicle drive or ignition cycle.

Current vehicle sounds and vibrations are measured for the vehicle being driven (step 202). Specifically, as the user's vehicle is being driven in step 208, various vehicle-related sounds and vibrations are measured via one or more sensors, for example as the vehicle is being driven by a user along a road. In one embodiment, the sounds and vibrations measured in step 202 include sounds or vibrations that originate, directly, or indirectly, via operation of the powertrain, such as the engine (and/or one or more other transmission system components, such as an electric motor). Also in one embodiment, the sounds and vibrations are measured with respect to one or more vehicle components that are mechanically coupled to an engine (or other transmission system component) of the vehicle as the sound is naturally, or organically, occurring within the vehicle. In one embodiment, the measured sounds and vibrations include engine mounting apparatus 131 vibrations and/or sounds (and/or those of an electric motor and/or other transmission system components) as measured by the engine mount sensors 163 (e.g. via one or more microphones and/or accelerometers), induction system 132 sounds and vibrations as measured by the induction system sensors 162 (e.g.

via one or more microphones and accelerometers), exhaust system 133 sounds and vibrations as measured by the exhaust sensors 164 (e.g. one or more microphones and accelerometers), other powertrain 129 related sounds and vibrations (e.g. of an electric motor, via one or more microphones and accelerometers), suspension system 117 sounds and vibrations (e.g. via one or more microphones and accelerometers), and/or other vehicle-related vehicle sounds and vibrations. In various embodiments, the number and/or types of engine-related sounds and vibrations (and/or other sounds and vibrations, such as those described above) and measured being measured, and/or the sensors utilized, may vary. In certain embodiments, the sound and vibration measurements of step 202 may be continuous. In certain other embodiments, the sound and vibration measurements may be periodic.

In addition, the recorded sounds and vibrations are processed (step 204). In one embodiment, the recorded sounds and vibrations are processed in step 204 with respect to specific reference sounds and/or levels of the sounds and vibrations, such as the magnitude, frequency, phase and waveform of the sounds and vibrations. Also in one embodiment, various vehicle parameters that may affect engine sound and vibration (among other sounds and vibrations, such as those described above) are monitored as part of the processing of step 204. For example, in one embodiment, the speed and acceleration of the vehicle are monitored in step 204 along with the powertrain-produced torque (e.g. engine or motor produced torque), engine rpm (or motor rpm), and the driver's acceleration of the accelerator pedal. Also in one embodiment, these parameter values are obtained via respective sensors of the sensor array 104 of FIG. 1.

Stored values are retrieved from memory and compared with the current vehicle sound and parameter values (step 206). In one embodiment, one or more look-up tables are retrieved from the memory 174 of FIG. 1 in step 206, so that the engine sounds associated with the current vehicle parameter values are compared with expected engine sounds and vibrations associated with these vehicle parameter values using the look-up table(s).

As depicted in FIG. 2, in one embodiment, the look-up tables used in step 206 were previously generated using a sub-process 208 that represents prior vehicle testing. In one embodiment, sub-process 208 is performed prior to the vehicle being sold to the public (e.g., in product development using test vehicles).

Specifically, in one embodiment, as part of the sub-process 208, test vehicles are operated in a controlled environment under various vehicle conditions that are likely to affect vehicle sounds and vibrations (e.g. that are likely to affect engine-related sounds and vibrations) (step 210). Specifically, in one embodiment, the test vehicles are operated at various different combinations of vehicle speed, vehicle acceleration, accelerator pedal engagement, engine-produced torque, and engine rpm. In one embodiment, during step 210, various test vehicles are operated under a plurality of conditions, each of the plurality of conditions representing a different combination of values of different vehicle parameters (e.g. vehicle speed, vehicle acceleration, engine-produced torque, engine rpm, and accelerator pedal engagement, such as accelerator pedal force and/or travel, and the like). Also in one embodiment, such tests are performed in a wind tunnel for various test vehicles of a particular vehicle model being designed and/or tested.

Also as part of the sub-process 208 (e.g. prior vehicle testing), various engine-related sounds and vibrations are measured (step 212). Specifically, during the test runs of step 210, various vehicle sounds and vibrations (e.g. including engine-related sounds and vibrations, and other vehicle sounds and vibrations, such as those described above) are measured and/or recorded via one or more sensors. In one embodiment, the measured sounds and vibrations originate, directly, or indirectly, via operation of the engine (and/or other powertrain component, such as an electric motor). Also in one embodiment, the measured sounds and vibrations are measured with respect to one or more vehicle components that are mechanically coupled to an engine (or other powertrain component) of the vehicle as the sound or vibration is naturally, organically, occurring within the vehicle. In one embodiment, the measured sounds and vibrations include engine mounting apparatus 131 sounds or vibrations as measured by the engine mount sensors 163 or other powertrain or suspension mount sensors (e.g. via one or more microphones or accelerometers), induction system 132 sounds or vibrations as measured by the induction system sensors 162 (e.g. via one or more microphones or accelerometers), exhaust system 133 sounds or vibrations as measured by the exhaust sensors 164 (e.g. one or more microphones or accelerometer) and/or other sounds or vibrations (e.g. pertaining to the suspension system 117, such as for a mounting apparatus thereof). In various embodiments, the number and/or types of engine-related (and/or other powertrain-related) sounds and vibrations being measured, and/or the sensors utilized, may vary. In one embodiment, the engine related sounds and vibrations (and/or other target sounds and vibrations) are measured for each of the plurality of conditions (and combinations thereof) of the testing of step 210. Also, similar to the discussions above, in certain embodiments the measured sounds and vibrations may pertain to an electric motor and/or one or more other transmission system components.

Also as part of the sub-process 208 (e.g. prior vehicle testing), information pertaining to the sounds and vibrations is stored in memory (step 214). In various embodiments, look-up tables and/or other data storage instruments are used to record each of the various engine-related sounds and vibrations of step 212 for each of the following vehicle conditions reflected in the testing operation of the vehicles in step 210. Specifically, in one embodiment, such look-up tables include, for each combination of vehicle speed, vehicle acceleration, engine-produced torque, engine rpm, and measure of acceleration pedal engagement, corresponding engine-related sounds and vibrations, such as engine mounting apparatus 131 sounds and vibrations, induction system 132 sounds and vibrations, exhaust system 133 sounds and vibrations, and suspension system 117 sounds and vibrations. In one embodiment, the information stored in memory includes the information pertaining to each of the plurality of combinations of conditions/parameter values of step 210 along with the corresponding engine-related sounds and vibrations (and/or other target sounds and vibrations) of step 212 for each of the plurality of combinations of conditions/parameter values, for subsequent use in diagnosing one or more vehicle systems or devices by comparing engine-related sounds and vibrations (and/or other target sounds and vibrations) in a subsequent drive cycle with the stored information (e.g. in the above-referenced step 206). In one embodiment, once the vehicle model is completely developed and tested, each model vehicle includes such a look-up table as stored values 184 of the memory 174 thereof. It will be appreciated that different versions of the particular model (e.g. a sport version, a touring version, and so on) may have different corresponding tables stored in the corresponding memory 174 of the respective vehicles. In one embodiment, the memory 174 stores frequency, phase, and amplitude values as they correspond to the rotation or revolutions per minute (RPM) of the engine or motor, the powertrain torque (e.g. engine or motor torque), vehicle speed, and the like, along with stored different gains and amplitude levels for various driver modes for the vehicle (e.g. a sport mode, a touring mode, and so on).

With reference again to the above-mentioned step 206, in one embodiment the look-up tables of step 214 are retrieved in, and are used as inputs in, step 206. Specifically, in one embodiment, during step 206, the look-up tables of step 214 (i.e. from the prior testing) are retrieved during step 206 and used for the processing of the sounds in the current ignition cycle of steps 201-206.

Specifically, in one embodiment, the look-up tables are used so that the engine sounds and vibrations associated with the current vehicle parameter values are compared with expected engine sounds and vibrations associated with these vehicle parameter values using the look-up tables. In one embodiment, (a) the engine induction, engine mounting apparatus, and exhaust system sounds and vibrations measured in step 202 are compared with (b) corresponding engine induction, engine mounting apparatus, exhaust system sounds and vibrations, and/or other engine related sounds and vibrations from the look-up table(s) that resulted during testing of the test vehicles with vehicle parameter values in steps 210 and 212 that are similar to those currently experienced in the user-owned vehicle in steps 201-206. For example, in one embodiment, the sounds and vibrations represented in the look-up tables corresponding with similar vehicle speed, vehicle acceleration, engine-produced torque, engine rpm, and user engagement of the accelerator pedal are compared with the current sounds and vibrations measured in step 202. Similar to the discussion above, it will be appreciated that in various embodiments different sounds and vibrations may be utilized (e.g. pertaining to electric motor-related sounds, other powertrain-related sounds, and so on). In one embodiment, the comparisons of step 206 are made by the processor 172 of FIG. 1.

Additional explanation will be provided with respect to one exemplary embodiment. For example, suppose that the vehicle is currently being driven with a vehicle speed of fifty miles per hour (50 mph) with the engine operating at five thousand revolutions per minute (5000 rpm) in the current ignition cycle of steps 201-206. In this example, during the current ignition cycle, these parameter values (e.g. vehicle speed and engine rpm) were measured as part of step 204, and resulting engine-related sounds and vibrations were measured during step 202, all during the current ignition cycle. During step 206, the look-up table is used to compare these sounds and vibrations (of step 202) with previously measured sounds and vibrations from when the test vehicles were tested under similar conditions in steps 210-212 (e.g. when test vehicles of the same make, model, and type were tested at a vehicle speed of 50 mph with an engine rotation of 5000 rpm). In this example, the current sounds and vibrations of step 202 (from the current ignition cycle) can be considered the "current" sounds and vibrations, while the previously-recorded sounds and vibrations from the prior testing of steps 210-212 can be considered the "expected" sounds and vibrations. During step 206, the "current" sounds and vibrations are compared with the "expected" sounds and vibrations. While vehicle speed and engine rpm are provided as two illustrative examples, it will be appreciated that, in certain embodiments, step 206 includes similar comparisons of "current" sounds and vibrations with "expected" sounds and vibrations for various of the other vehicle parameters (and combinations thereof), such as those referenced above (e.g. accelerator pedal engagement, vehicle acceleration, engine-produced torque, and so on).

A determination is made as to whether the sounds or vibrations are consistent with one another (step 216). In one embodiment, this determination is made based on the comparison of step 216 as to whether the "current" sounds of the current drive cycle (e.g. a current engine ignition cycle for the vehicle) are consistent with the "expected" sounds from prior testing of the vehicle under similar parameter conditions. Specifically, in one embodiment, a determination is made as to whether the current measured sounds and vibrations of step 202 are within an acceptable range of the expected sounds from the look-up tables of step 206 (e.g. whether the "current" sounds and vibrations are close enough to the "expected" sounds and vibrations in view of the vehicle speed, engine rpm, and/or other vehicle parameter values). Also in one embodiment, this determination is performed by the processor 172 of FIG. 1.

Based on the determination of step 216, one or more actions may be taken (step 218). Also based on the determination of step 216, the process may also return to step 202, as sounds and vibrations continue to be measured as the process repeats. In addition, in certain embodiments, the process may turn off and/or modify (e.g. by changing the level and/or content of output of) any sound-enhancement that is currently being performed (for example, for engine, powertrain, induction system, exhaust system, and/or suspension system related sounds). In addition, in certain embodiments, an error message may be provided via the notification unit 108 indicating that service is recommended for the vehicle and/or for one or more systems and/or components thereof. For example, in certain embodiments, the error message may be provided in any one or more of a number of different manners, such as a visual message on a dashboard or screen of the vehicle, an audio message provided within the vehicle, an e-mail, text, or other message sent to a user's telephone and/or personal electronic device, and so on.

In one embodiment, during step 218, one or more notifications (e.g. audible notifications, visual notifications, haptic notifications, and/or the transmission of electronic message, among other possible notifications) are provided for one or more users of the vehicle via the notification unit 108 of FIG. 1, based on instructions provided by the processor 172 of FIG. 1. In addition, in certain embodiments, the controller 106 may take one or more other actions. For example, if the controller 106 determines that a particular vehicle system has been tampered with, then the controller 106 may turn off and/or discontinue use of such vehicle systems, among other possible actions. For example, in one embodiment, if the exhaust system sound is significantly greater than what would be expected based on the vehicle parameters (e.g. with reference to the stored look-up table(s) for the given vehicle parameter values), then a determination may be made that the vehicle's muffler has been tampered with or removed, and one or more appropriate actions may be taken (e.g. be providing a warning, controlling and/or disconnecting one or more vehicle systems, or the like). In addition, in another embodiment, vehicle sound enhancements may also be modified based on the comparison between the "current" sounds and the "expected" sounds. In certain embodiments, an error message may be provided via the notification unit 108 indicating that service is recommended for the vehicle and/or for one or more systems and/or components thereof. For example, in certain embodiments, the error message may be provided in any one or more of a number of different manners, such as a visual message on a dashboard or screen of the vehicle, an audio message provided within the vehicle, an e-mail, text, or other message sent to a user's telephone and/or personal electronic device, and so on. In addition, in certain embodiments, a message or other communication may be provided to a driver or other user of the vehicle with the ability for the driver or other user of the vehicle to turn off the error message and/or to accept the new/current sound and disable the error messages permanently as may be appropriate.

Accordingly, methods, systems, and vehicles are provided for providing vehicle diagnosis based on vehicle sound. In various embodiments, the disclosed methods, systems and vehicles compare engine-related sounds (e.g. from the induction system, engine mounting apparatus, and/or exhaust system) with expected engine-related sounds in view of specific vehicle parameters (e.g. vehicle speed, vehicle acceleration, engine-produced torque, engine rpm, and user engagement of the accelerator pedal) in diagnosing one or more vehicle systems.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. In addition, it will be appreciated that certain steps of the process 200 may vary from those depicted in FIG. 2 and/or described above in connection therewith. It will similarly be appreciated that certain steps of the methods described above may occur simultaneously or in a different order than that depicted in FIG. 2 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   measuring a sound, a vibration, or both produced by one or more vehicle components of a vehicle;
   measuring one or more vehicle parameters during operation of a vehicle, the vehicle parameters pertaining to operation of an engine of the vehicle, a requested acceleration for the vehicle, or both;
   comparing the measured sound, vibration or both with an expected sound, vibration, or both for the one or more vehicle components that would be expected for the vehicle as it is operated given the vehicle parameters pertaining to operation of an engine of the vehicle, a requested acceleration for the vehicle, or both, generating a comparison; and
   diagnosing a vehicle system or device using the comparison of the measured sound, vibration, or both with the expected sound, vibration, or both for the one or more vehicle components that would be expected for the vehicle as it is operated given the vehicle parameters pertaining to operation of an engine of the vehicle, a requested acceleration for the vehicle, or both.

2. The method of claim 1, further comprising:
   modifying a sound enhancement for one or more vehicle systems, based on the comparison.

3. The method of claim 1, wherein:
   the step of measuring the one or more vehicle parameters comprises measuring one or more of the following (a), (b), and/or (c), during operation of a vehicle: (a) a powertrain torque, (b) a number of revolutions per minute of the engine, and/or (c) an engagement of the accelerator pedal;
   the step of comparing the measured sound or vibration with the expected sound comprises comparing the measured sound, vibration, or both with an expected sound, vibration, or both for the one or more vehicle components that would be expected for the vehicle as it is operated given the vehicle parameters pertaining to one or more of the (a) powertrain torque, (b) number of revolutions per minute of the engine, and/or (c) engagement of the accelerator pedal, generating the comparison; and
   the step of diagnosing the vehicle system or device comprises diagnosing the vehicle system or device using the comparison of the measured sound and/or vibration with the expected sound and/or vibration that would be expected for the vehicle as it is operated given the vehicle parameters pertaining to one or more of the (a) powertrain torque, (b) number of revolutions per minute of the engine, and/or (c) engagement of the accelerator pedal.

4. The method of claim 3, wherein the step of comparing the measured sound or vibration with an expected sound or vibration from the one or more vehicle components based on prior vehicle testing of one or more different test vehicles including measurement of vehicle sounds, vibrations, or both under conditions of the test vehicles as the test vehicles are operated with similar values, as the vehicle, of the one or more of the (a) powertrain torque, (b) number of revolutions per minute of the engine, and/or (c) engagement of the accelerator pedal.

5. The method of claim 1, wherein:
   the step of measuring the one or more vehicle parameters comprises measuring a powertrain torque during operation of a vehicle; and
   the step of comparing the measured sound or vibration with an expected sound or vibration comprises comparing the measured sound, vibration, or both with an expected sound, vibration, or both for the one or more vehicle components that would be expected for the vehicle as it is operated given the measured powertrain torque.

6. The method of claim 1, wherein:
   the step of measuring the one or more vehicle parameters comprises measuring a number of revolutions per minute (rpm) of an engine of a vehicle during operation of the vehicle; and
   the step of comparing the measured sound or vibration with an expected sound or vibration comprises comparing the measured sound, vibration, or both with an expected sound, vibration, or both for the one or more vehicle components that would be expected for the vehicle as it is operated given the measured rpm of the engine.

7. The method of claim 1, wherein:
   the step of measuring the one or more vehicle parameters comprises measuring an engagement of an accelerator pedal of a vehicle during operation of the vehicle; and the step of comparing the measured sound or vibration with an expected sound or vibration comprises comparing the measured sound, vibration, or both with an expected sound, vibration, or both for the one or more vehicle components given the measured engagement of the accelerator pedal.

8. The method of claim 1, wherein:
the step of measuring a sound or vibration comprises measuring a sound from an induction system of the vehicle using a sound sensor;
the step of generating the comparison comprises comparing the measured induction system sound with an expected induction system sound that would be expected for the vehicle as it is operated given the vehicle parameters pertaining to operation of an engine of the vehicle, a requested acceleration for the vehicle, or both; and
the step of diagnosing a vehicle system or device comprises diagnosing the vehicle system or device using the comparison of the measured induction system sound with the expected induction system sound that would be expected for the vehicle as it is operated given the vehicle parameters pertaining to operation of an engine of the vehicle, a requested acceleration for the vehicle, or both.

9. The method of claim 1, wherein:
the step of measuring a sound or vibration comprises measuring a sound from an exhaust system of the vehicle using a sound sensor;
the step of generating the comparison comprises comparing the measured exhaust system sound with an expected exhaust system sound that would be expected for the vehicle as it is operated given the vehicle parameters pertaining to operation of an engine of the vehicle, a requested acceleration for the vehicle, or both; and
the step of diagnosing a vehicle system or device comprises diagnosing the vehicle system or device using the comparison of the measured exhaust system sound with the expected exhaust system sound that would be expected for the vehicle as it is operated given the vehicle parameters pertaining to operation of an engine of the vehicle, a requested acceleration for the vehicle, or both.

10. The method of claim 1, wherein:
the step of measuring comprises measuring a vibration from a powertrain mounting apparatus using a vibration sensor;
the step of generating the comparison comprises comparing the measured vibration with an expected vibration from the powertrain mounting apparatus that would be expected for the vehicle as it is operated given the vehicle parameters pertaining to operation of an engine of the vehicle, a requested acceleration for the vehicle, or both; and
the step of diagnosing a vehicle system or device comprises diagnosing the vehicle system or device using the comparison of the measured vibration with the expected vibration that would be expected for the vehicle as it is operated given the vehicle parameters pertaining to operation of an engine of the vehicle, a requested acceleration for the vehicle, or both.

11. A method comprising:
operating one or more test vehicles under a plurality of conditions, each of the plurality of conditions representing a different combination of values of different vehicle parameters during operation of test vehicles, the vehicle parameters pertaining, for each test vehicle, to operation of an engine of the test vehicle, a requested acceleration for the test vehicle, or both;
measuring a corresponding powertrain-related sound, vibration, or both for each of the plurality of conditions for the test vehicles; and
storing, in memory, information pertaining to each of the plurality of conditions along with the corresponding powertrain-related sound, vibration, or both for each of the plurality of conditions, for subsequent use in diagnosing one or more vehicle systems or devices for a different vehicle by comparing engine-related sounds, vibrations, or both in a subsequent drive cycle of the different vehicle with the stored information when the different vehicle is driven under similar conditions for the parameters of the different vehicle pertaining to operation of an engine of the different vehicle, a requested acceleration for the different vehicle, or both.

12. A system comprising:
one or more first sensors configured to measure a sound, a vibration, or both produced by one or more vehicle components of a vehicle;
one or more additional sensors configured to measure one or more vehicle parameters during operation of the vehicle, the vehicle parameters pertaining to operation of an engine of the vehicle, a requested acceleration for the vehicle, or both; and
a processor coupled to the one or more first sensors and to the one or more additional sensors, the processor configured to:
compare the measured sound, vibration, or both with an expected sound, vibration, or both for the one or more vehicle components that would be expected for the vehicle as it is operated given the vehicle parameters pertaining to operation of an engine of the vehicle, a requested acceleration for the vehicle, or both, generating a comparison; and
diagnose a vehicle system or device using the comparison of the measured sound, vibration, or both with the expected sound, vibration, or both for the one or more vehicle components that would be expected for the vehicle as it is operated given the vehicle parameters pertaining to operation of an engine of the vehicle, a requested acceleration for the vehicle, or both.

13. The system of claim 12, wherein:
the one or more additional sensors are configured to measure one or more of the following (a), (b), and/or (c) vehicle parameters during operation of a vehicle: (a) a powertrain torque, (b) a number of revolutions per minute of the engine, and/or (c) an engagement of the accelerator pedal; and
the processor is further configured to:
compare the measured sound, vibration, or both with an expected sound, vibration, or both for the one or more vehicle components that would be expected for the vehicle as it is operated given the vehicle parameters pertaining to one or more of the (a) powertrain torque, (b) number of revolutions per minute of the engine, and/or (c) engagement of the accelerator pedal, generating the comparison to generate the comparison; and
diagnose the vehicle system or device using the comparison of the measured sound and/or vibration with the expected sound and/or vibration that would be expected for the vehicle as it is operated given the vehicle parameters pertaining to one or more of the (a) powertrain torque, (b) number of revolutions per minute of the engine, and/or (c) engagement of the accelerator pedal.

14. The system of claim 13, further comprising:
a memory configured to store information from prior vehicle testing of one or more different test vehicles including measurement of vehicle sounds under conditions of the test vehicles as the test vehicles are operated with similar values, as the vehicle, of the one or more of the (a) powertrain torque, (b) number of revolutions per minute of the engine, and/or (c) engagement of the accelerator pedal;
wherein the processor is further configured to generate the comparison using the stored information from the memory.

15. The system of claim 12, wherein:
the one or more additional sensors are configured to measure a powertrain torque during operation of a vehicle;
the one or more vehicle parameters include the powertrain torque; and
the processor is configured to:
  compare the measured sound, vibration, or both with an expected sound, vibration, or both for the one or more vehicle components that would be expected for the vehicle as it is operated given the measured powertrain torque, generating the comparison; and
  diagnose the vehicle system or device using the comparison of the measured sound, vibration, or both with the expected sound, vibration, or both for the one or more vehicle components that would be expected for the vehicle as it is operated given the measured powertrain torque.

16. The system of claim 12, wherein:
the one or more additional sensors are configured to measure an engagement of an accelerator pedal of the vehicle;
the one or more vehicle parameters include the measure of the engagement of the accelerator pedal; and
the processor is configured to:
  compare the measured sound, vibration, or both with an expected sound, vibration, or both for the one or more vehicle components that would be expected for the vehicle as it is operated given the measured engagement of the accelerator pedal; and
  diagnose the vehicle system or device using the comparison of the measured sound, vibration, or both with the expected sound, vibration, or both for the one or more vehicle components that would be expected for the vehicle as it is operated given the measured engagement of the accelerator pedal.

17. The system of claim 12, wherein the one or more first sensors are configured to measure the sound from one or more vehicle components that are mechanically coupled to an engine of the vehicle.

18. The system of claim 12, wherein the one or more first sensors comprise a microphone configured to measure the sound from an induction system of the vehicle.

19. The system of claim 12, wherein the one or more first sensors comprise a microphone configured to measure the sound from an exhaust system of the vehicle.

20. The system of claim 12, wherein the one or more sensors comprise a vibration sensor configured to measure the vibration of a powertrain mounting apparatus of the vehicle.

* * * * *